Dec. 4, 1945. D. M. O'DWYER 2,390,317
STEERING INDICATOR DEVICE FOR VEHICLES
Filed May 19, 1944 3 Sheets-Sheet 1

Inventor
D. M. O'Dwyer
By Glasser Downing Lutkus
Attys

Dec. 4, 1945.  D. M. O'DWYER  2,390,317
STEERING INDICATOR DEVICE FOR VEHICLES
Filed May 19, 1944  3 Sheets-Sheet 2

Inventor
D. M. O'Dwyer
By Hasenck Downing & Seebold
Attys.

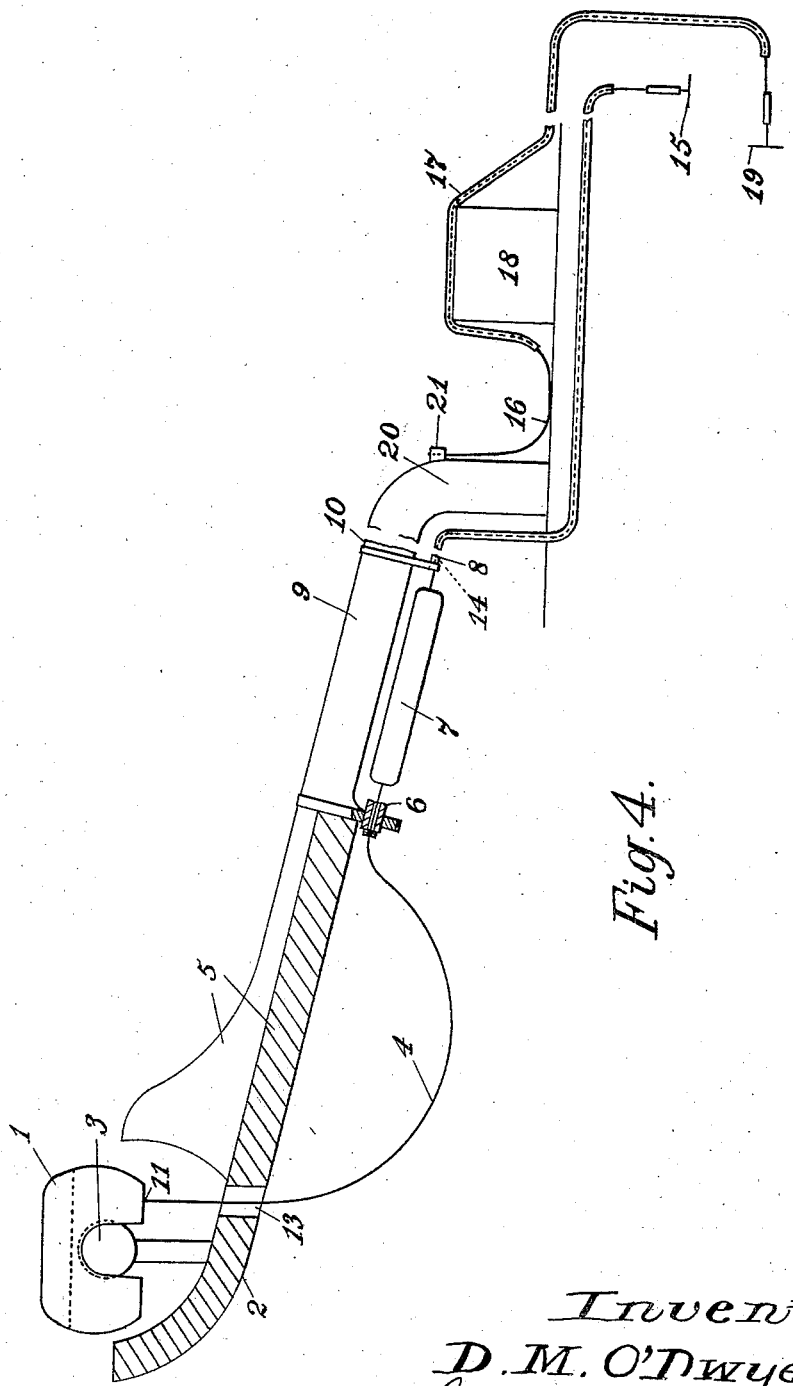

Patented Dec. 4, 1945

2,390,317

UNITED STATES PATENT OFFICE 2,390,317

STEERING INDICATOR DEVICE FOR VEHICLES

Daniel Michael O'Dwyer, London, England

Application May 19, 1944, Serial No. 536,391
In Great Britain October 16, 1943

2 Claims. (Cl. 116—124)

This invention relates to steering indicator devices for vehicles and more specifically for trolley buses and the like.

Steering indicator devices which indicate to the driver merely the angle between a horizontal projection of the poles and a line representing the direction of progress of the vehicle are ineffective, since the vehicle may assume a considerable angle to the direction of the trolley wires without the above angle giving any indication of such conditions; the indicator would imply that all was well with the direction of the vehicle whereas in actual fact it would be proceeding laterally away from the wires.

Electric direction control apparatus has been proposed for trolley buses and the like embodying means for detecting angular displacement of the boom in relation to the overhead cable, further means for detecting angular displacement of the boom in relation to the vehicle and means for separately or collectively recording by visual indication, any such detected displacements.

The main object of the present invention is to provide an improved or simplified steering device by aid of which steering of such vehicles under foggy conditions will be facilitated.

The invention consists in steering indicator mechansm having features set out in the claims appended hereto.

Referring to the accompanying drawings:

Figure 4 is a diagram illustrating an alternative arrangement for use in association with the present invention.

Figure 1:
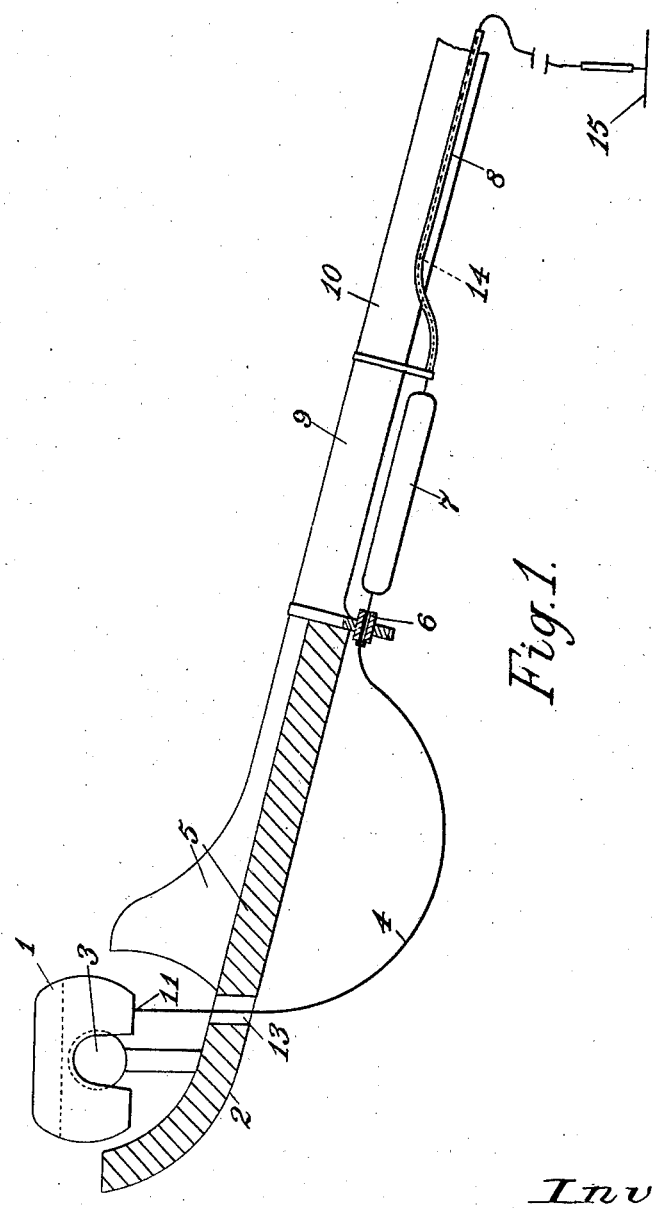
Figure 1 is part of a diagrammatic elevational view of one convenient arrangement embodying the present invention.

In carrying the invention into effect according to one convenient form illustrated by way of example as applied to a trolley bus having two separate pivoted trolley arms terminating in grooved trolley shoes engaging two overhead trolley wires, I provide a mechanical connection between one of the trolley shoes 1 and a pointer 15 in the driver's cab by means of which the pointer is constrained to point always in a direction parallel to the direction of the trolley wire associated therewith.

The mechanical connection comprises a flexible cable 14 carried in a flexible sheath 8 attached to the trolley arm, this cable at its lower end being in turn connected to the pointer and at its upper end being connected to a flexible cable 4 by way of an insulating member 7.

The flexible cable 4 is attached at 11 to the under surface of the trolley shoe 1 at its forward end but as near to the pivoting support 3 as is convenient. This attachment 11 might be conveniently by means of a sleeve screw fitting over the cable, the latter being provided with projections to fit into a groove in the shoe and thereby prevent rotation of the cable independently of the trolley shoe. Any other suitable means of attachment, may, however, be used. The flexible cable passes through an aperture 13 in the trolley head 2 and forms a loop immediately underneath the trolley head. The object of this loop is to allow for a certain amount of drawing up of the cable in rotatory movements of the trolley shoe relative to the trolley boom and trolley head. The flexible cable then passes through a sleeve 6, attached to the under surface of the trolley head before being attached to the insulator 7. This insulator is preferably adjacent to the insulator 9 whose function is to insulate the trolley head 2 from the rest of the trolley pole 10. The cable 4 is firmly attached to the insulator 7 in such a way that the insulator rotates with the flexible cable. The other end of the insulator 7 is similarly attached to the lower part of the flexible cable 14.

The covered cable 14 may if desired enter the interior of the trolley pole 10 to be carried down to the driver's cab as shown.

Any desired alternative system of insulation between the cables 4 and 14 may be used. The portion of the flexible cable 4 may be enclosed in a flexible sheath if desired, although since the cable may be more flexible uncovered it is preferred to leave is uncovered.

The flexible cable 14, where it emerges from the lower end of the trolley pole, is led over the roof of the bus and passes to a convenient position, say beneath the roof of the driver's cab in front of the driver or on a dashboard in his view.

If the trolley shoe rotates through a quarter of a circle, the cable attached at 11 is drawn round with it and the cable rotates through a quarter of a circle; this rotation will be transmitted to the pointer 15 in the driver's cab. In order to ensure accuracy of the indication, the cable and the inner lining of the flexible sheath where it encloses the cable should be of smooth form in order to lessen friction as much as possible. The cable should also be freely covered with lubricating material of a suitable kind inside the flexible sheath and at the sleeve 6, in order to facilitate rotation.

Thus the pointer will always maintain a position parallel with the longitudinal axis of the trolley shoe, notwithstanding any relative movement of the trolley pole or the trolley bus itself.

The invention can be used with any type of pivoted trolley shoe, even with those not balanced on a ball and socket pivot. If convenient it can be attached to the central part of the base of the trolley shoe, or it may be attached as shown in Figure 1. With the cable attached as in Figure 1, the trolley shoe will not be able to rotate through a complete circle, nevertheless the cable will not interfere with any movements of the trolley shoe likely to occur while travelling engaging the trolley wire on a journey.

Figure 2:
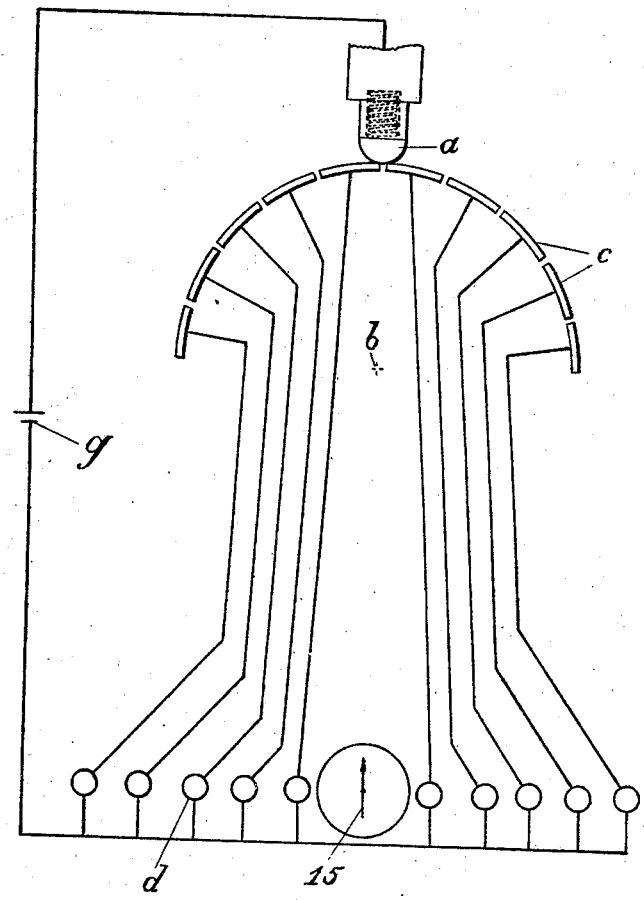
Figure 2 is a diagrammatic plan view of trolley pole position indicating mechanism for association with the arrangement illustrated in Figure 1.
Figure 3:
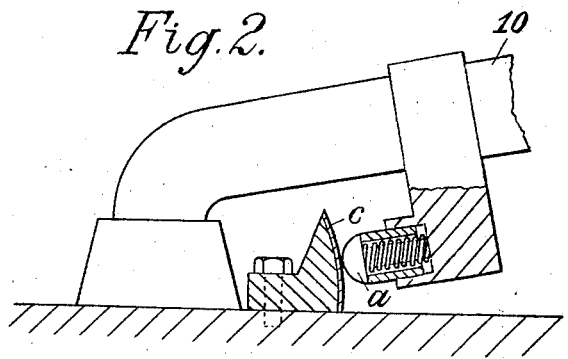
Figure 3 is a fragmentary sectional view of the contact device shown in Figure 2.

Attached to the trolley arm 10 near its pivot point I provide a spring-urged contact brush $a$ (Figure 3) in contact with a fixed spherical surface $c$ comprising a series of contact strips separated from one another electrically and connected respectively in the circuits of a plurality of electric lamps $d$ and a battery $g$ (Figure 2). The centre of the spherical surface $c$ coincides with the pivot axis of the trolley arm.

Owing to the spherical formation of the surface containing the fixed contact strips, contact is maintained notwithstanding operative movement of the trolley pole in vertical planes, due for example to the normal rise and fall in the height of the trolley wires above ground level.

The lamps may be arranged in a line on either side of the mechanical trolley shoe position indicator 15 as in Figure 2.

In operation, as the contact brush moves into contact with any particular contact strip, the electric lamp associated therewith is illuminated and thus indicates to the driver the angle at which a horizontal projection of the trolley arm rests in relation to the prevailing direction of progress of the bus. If the pointer connected with the trolley shoe points in a direction coinciding with the prevailing direction of progress of the bus, then an indication is afforded that the prevailing direction of travel of the bus is parallel to the direction of the trolley wires and this indication in conjunction with the indication given by the electric lamps enables the driver to ensure that the bus not only proceeds in a direction that is parallel to that of the trolley wires but also ensures that it shall not become excessively displaced laterally to either side of the trolley wires. In other words, the driver is enabled to steer the bus along its course beneath the trolley wires under foggy or dark conditions when visibility may be poor or even entirely lacking.

It is preferred that the trolley shoe associated with the pointer in the driver's cab is the trolley shoe associated with the trolley wire of lowest electrical potential and insulating means is incorporated in the mechanical connection between the trolley shoe and the pointer in order to avoid the danger of electric shock.

In carrying the invention into effect according to a modified arrangement illustrated in Figure 4, a second flexible cable 16 in flexible sheath 17 is provided. The flexible cable 16 is firmly attached to the swivelling trolley base 20 at 21, being the central forward position of the trolley base. The portion of the flexible cable immediately adjoining its connection with the swivelling trolley base 20 is arranged in the form of a loop between the trolley base and a raised portion of the roof of the bus 18. This loop allows the cable to follow the rotary movements of the swivelling trolley base. From the trolley base the cable is carried in a flexible sheath similar to that associated with the trolley shoe position indicator. The cable may thus be carried to the driver's cab in the sheath 17 and attached to a vertical pointer 19.

The cable may turn back as shown in Figure 4 before being attached to the pointer, whereby the indicator may give a more graphic indication of the position of the trolley boom. If, for instance, the bus is travelling on the right of the trolley wires, the trolley boom will be pointing towards the left and the indicator 19 would also be inclined to the left, and the driver would know that the trolley wires were on his left.

If desired, the flexible cable could be connected to the swivelling trolley base by a worm and bevelled wheel, the worm being on the termination of the cable and engaging a bevelled wheel attached to the swivelling trolley base. At the other end of the flexible cable a similar worm and bevelled wheel attached to the pointer would ensure that the pointer's position would correspond to the angle of the trolley pole with reference to the longitudinal axis of the trolley bus. Thus, there are two pointers in the driver's cab, the pointer 15 indicating the position of the trolley shoe and consequently the direction of the trolley wires, and the pointer 19 arranged in a vertical plane, if desired, indicating the angle of a vertical projection of the trolley pole on a horizontal plane in relation to the longitudinal axis of the trolley bus.

The means for indicating the angle of the trolley arm in relation to the longitudinal axis of the bus described above form no part of the present invention.

I claim:

1. Steering indicator mechanism for a trolley bus embodying a trolley pole, a trolley shoe pivoted thereon for engaging a trolley wire, a pointer on said bus visible to the driver, flexible driving cable means connected between said shoe and said pointer and insulating means electrically isolating said shoe from said pointer.

2. Steering indicator mechanism as claimed in claim 1, wherein the said flexible driving cable is divided into two parts mutually separated electrically but joined mechanically by said insulating means.

DANIEL MICHAEL O'DWYER.